May 19, 1931.  R. M. LYNN ET AL  1,806,404
MOTOR FUEL TREATING DEVICE
Filed Nov. 30, 1928
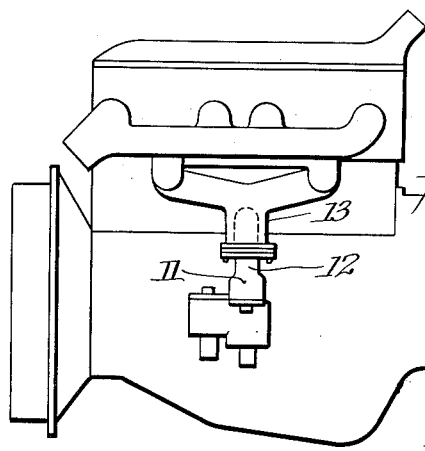
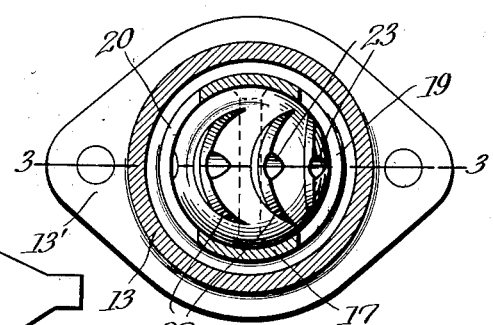
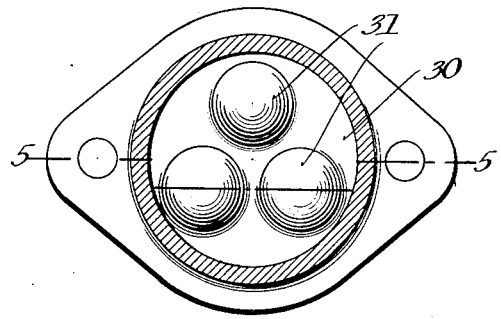
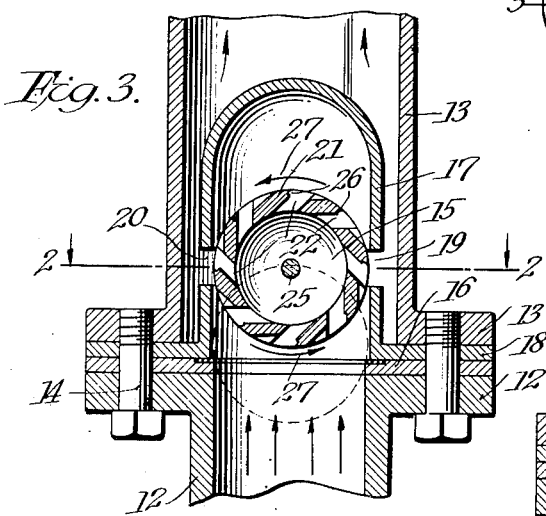
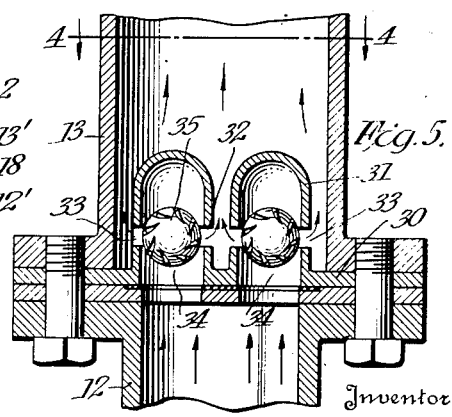
Inventor
Ross M. Lynn
Wm. M. Malouf Patented May 19, 1931

1,806,404

UNITED STATES PATENT OFFICE

ROSS M. LYNN AND WILLIAM M. MALOUF, OF SALT LAKE CITY, UTAH, ASSIGNORS TO ATOMIC POWER CORPORATION, A CORPORATION OF DELAWARE

MOTOR FUEL TREATING DEVICE

Application filed November 30, 1928. Serial No. 322,913.

The present invention relates to devices for treating fuel air preliminary to its use in heating and power plants, such as internal combustion engines.

An object of the invention is to provide means for treating the air which constitutes the combustible fuel so as to make the air a more satisfactory fuel constituent and to reduce the percentage of hydrocarbon or other fuel constituent required to be mixed with the air.

The invention contemplates the provision of a spherical body disposed in the fuel stream and formed so that upon engagement by the stream the body will be rapidly rotated, thus breaking up the stream and improving the characteristics of the fuel mixture. The air may be subjected to the action of the device either before it is mixed with the hydrocarbon or other vapors or after the carbureted mixture is produced, it being understood in the latter instance that the mixture is agitated by the rapidly rotating element.

Preferably the rotating sphere is freely supported by the air stream as well as rotated thereby so that the agitation is affected without contact of moving metallic parts with stationary parts as would be the case were the body supported by an axle or trunnions. It has been found that the body rotates under the force of the air stream at an extremely high R. P. M. and therefore a freely supported rotating body as distinguished from one carried by an axle or other supports is desirable.

As shown, the invention is applied to the conduit between a carburetor and the intake manifold of an internal combustion engine and consists essentially of means whereby the combustible mixture delivered from the carburetor will be agitated and a very intimate mixture of air and hydrocarbon vapors obtained. It has been found that the proportion of hydrocarbon vapors required to provide a suitable mixture is greatly reduced from that ordinarily found necessary.

In the accompanying drawings:

Figure 1 is a side elevational view showing the relation of the device to the engine and carburetor.

Figure 2 is a horizontal sectional view on the line 2—2 of Figure 3, the rotating spherical body being shown in top plan.

Figure 3 is a vertical sectional view on the line 3—3 of Figure 2.

Figure 4 is a horizontal sectional view of a modified construction on the line 4—4 of Figure 5.

Figure 5 is a vertical sectional view on the line 5—5 of Figure 4.

Referring to the drawings, 10 indicates diagrammatically an internal combustion engine having a carburetor 11 connected by a conduit 12 with an intake manifold 13, the conduit and manifold having facing flanges 12', 13', secured together by screws 14. A hollow body 15, preferably spherical in shape, is disposed within the passage and when the engine is inactive, is supported as shown in dotted lines, by a plate 16 having a central opening aligned with the conduit 12. This agitating body 15 is disposed within a dome-shaped housing 17 of slightly less diameter than the surrounding passage and is secured in position by a base flange 18 disposed between the flanges 12', 13', the bolts 14 passing therethrough as illustrated in Figure 3. The dome has lateral openings 19 and 20 through which the ascending stream may pass under the influence of the engine suction or by pressure, if pressure is employed either in lieu of or in association with the suction. As will be observed, the dome is of slightly larger diameter than the passage through the conduit 12 so that the sphere may rotate freely when supported and rotated by the upwardly travelling stream which in the present instance is a mixture of air and hydrocarbon vapors.

The agitating device 15 may be of various forms, although it is preferred that it be of spherical shape and so designed that the stream passing upwardly and through the openings 19 and 20 will be broken up. For this purpose, the sphere may be hollow and formed with a plurality of peripheral lips 21 disposed in the vertical planes of the openings 19, 20; these lips are arcuate in shape and undercut to provide apertures or grooves 22. The top of each lip on the surface of the sphere may be formed with a series of notches 23 disposed substantially in a plane bisecting each lip so that the greater volume of the stream will be directed against substantially the centers of the lips 21 thereby to rotate the sphere about a single diametrical axis coinciding with a transverse centrally disposed reinforcing pin 25. Moreover, each lip at its edge may be chamfered to provide a shoulder 26 to insure a more forceful engagement of the stream with the undersurface of each lip.

It is found that the suction of the engine will raise the spherical body from the dotted line inactive position illustrated in Figure 3 to the full line position shown in that figure and will also rapidly revolve the ball in the direction of the arrows 27 about an axis corresponding to that of the reinforcing pin 25. The suction will not lift the body substantially above the openings 19 and 20 due to the formation of an air cushion within the dome above these openings. Consequently, the body will revolve in the horizontal plane of the openings 19 and 20 and the lips moving across the openings break up the stream passing upwardly and through the openings. The stream passing to the right of the body (Figure 3) toward the opening 19 will have imparted thereto a centrifugal impulse and the sphere will carry some of the stream around and through the opening 20.

It has been found that the sphere revolves at very high speeds; it may be formed from any suitable material such as hard metal. The effect of the rotation of the body is to increase the intimacy of the mixture and it also has a marked effect upon the air alone if the air only, instead of the mixture, is subjected to this body.

It will be understood that the undersurface of each lip 21, including the notches or shoulders 26, constitute abutments against which the stream of mixture flowing from the carburetor through the conduit 12 will impinge so as to lift the body to the full line position shown in Figure 3 and to rotate the same rapidly.

As will be observed, each lip is extended to each side of the diametrical plane of the body which bisects the axis 25 so as to provide the uninterrupted crescent shaped grooves 22. As the stream of mixture passing through the conduit strikes the abutments or undersurfaces of the lips 21, the portions of the stream will be agitated and directed through the openings 19 and 20. The speed of rotation of the body will vary, of course, with the suction or pressure.

In the embodiment of the invention illustrated in Figures 4 and 5, a flange 30 secured between the flanges of the conduit 12 and manifold 13 serves to support a plurality of domes 31, each having outlets 32, 33 for the mixture which enters the lower ends 34 of the domes. Each dome contains a rotatable spherical body 35 each corresponding in construction to the body illustrated in Figure 3 and adapted to be freely supported by the force of the ascending stream and rotated thereby within its respective dome. In some instances, it will be found that the use of a multiplicity of bodies instead of a single body will be preferable.

In view of the fact that each of the bodies corresponds in construction to that illustrated in Figure 3, it is not necessary to describe in detail the formation of the lips and grooves which form portions against which the mixture stream may impinge.

The effect of the devices herein described on the air or upon the mixture of air and hydrocarbon supplied to the engine is very marked. The devices operate to homogenize the gaseous stream by which the rotation is effected and as a result there is a large decrease in the percentage of hydrocarbon vapors required to produce a satisfactory fuel.

As will be understood, the formation of the grooves and lips may be varied considerably without departing from the invention, it simply being desirable to provide portions of the spherical body against which the stream will impinge to impart to the body the desired rotation. It is, of course, desirable to arrange the lips or other abutment portions of the body so that the latter will rotate about a single axis and out of contact with the surrounding walls to guard against bodily horizontal movement of the body. Obviously, numerous modifications may be made in the structure illustrated and described without departing from the invention, the essential features of which are more definitely set forth in the following claims.

We claim:

1. A gaseous fuel homogenizing device comprising a housing, adapted to be positioned in a conduit for supplying gaseous fuel to the intake manifold of an internal combustion engine and to permit such fuel to pass therethrough, and a substantially spherical shaped body in said housing, said body being disconnected from the housing to permit free rotation and having a series of abutments thereon facing in a direction opposing the flow of gaseous fuel through the housing and conduit, for the purpose described.

2. A gaseous fuel homogenizing device, comprising a housing, adapted to be positioned in a conduit connected with the intake manifold of an internal combustion engine and to permit such a fuel stream to pass therethrough, and a body of substantially spherical form within but disconnected from the housing to permit free rotation, said body having a series of arcuate lips formed thereon and facing in a direction opposing the flow of the gaseous stream through the housing and conduit, for the purpose described.

3. A gaseous fuel homogenizing device, comprising a housing adapted to be positioned in a conduit connected with the intake manifold of an internal combustion engine and to permit a stream of gas to pass therethrough, said housing being closed at one end and having inlet and outlet ports, and a substantially spherical shaped body in said housing, said body being disconnected from the housing and having a series of abutments facing in a direction opposing the flow of the gaseous stream through the ports of the housing and the conduit, whereby the body will be freely rotated by the gas stream.

4. A gaseous fuel homogenizing device, comprising a housing adapted to be positioned in a conduit connected with the intake manifold of an internal combustion engine and to permit a gas stream to pass therethrough, said housing being closed at one end and having inlet and outlet ports, and a body of substantially spherical form within said housing, said body being disconnected from the housing to permit free rotation and having a series of arcuate lips facing in a direction opposing the flow of gas through the housing and conduit, for the purpose described.

5. In combination with a conduit for supplying gaseous fuel to an engine, a housing in said conduit forming a chamber closed at one end and having inlet and outlet ports through which the fuel stream travels as it passes through the conduit, and homogenizing means comprising a body of substantially spherical form arranged for unrestricted rotation in the housing, said body having peripheral abutments extending into the path of the gaseous fuel stream passing through the housing, whereby the body will be rotated in the housing.

6. In combination with a conduit for supplying gaseous fuel to an engine, a housing in said conduit closed at one end and having an inlet port at the other end and a lateral outlet port through which the fuel stream travels from the interior of the housing into the conduit, and a homogenizing body arranged in said housing for unrestricted free rotation by the fuel stream passing through said ports.

7. In combination with a conduit for supplying gaseous fuel to an engine, a housing in said conduit through which the fuel travels, said housing being closed at one end and having an inlet port at its other end and a lateral outlet port, and a homogenizing body of substantially spherical form within but disconnected from the housing to permit free rotation and having on its periphery surfaces forming abutments facing in a direction opposing the flow of the fuel stream passing through said ports for the purpose described.

In testimony whereof we have hereunto set our hands.

ROSS M. LYNN.
WILLIAM M. MALOUF.